United States Patent [19]

Nora

[11] 4,058,593

[45] Nov. 15, 1977

[54] TECHNETIUM-LABELED BONE SCANNING AGENTS

[75] Inventor: James C. Nora, Forest Lake, Minn.

[73] Assignee: Minnesota Mining and Manufacturing Company, St. Paul, Minn.

[22] Filed: Jan. 28, 1976

[21] Appl. No.: 653,077

Related U.S. Application Data

[63] Continuation of Ser. No. 417,612, Nov. 20, 1973, abandoned.

[51] Int. Cl.$^2$ .................... G01N 23/00; G21H 5/02
[52] U.S. Cl. ..................... 424/1; 23/230 B; 230.6; 252/301.1 R
[58] Field of Search...23/230 B; 230.3, 230.6, 253 TP, 253 R; 252/301.1 R; 424/1

[56] References Cited

U.S. PATENT DOCUMENTS

| 3,707,353 | 12/1972 | Kubiatowicz | 23/230 B |
|---|---|---|---|
| 3,725,295 | 4/1973 | Eckelman et al | 252/301.1 R |

OTHER PUBLICATIONS

Chervu et al., "Fluorotec: A New Bone Seeker," Radiology 107: 435–437 May 1973.

*Primary Examiner*—R. E. Serwin
*Attorney, Agent or Firm*—Cruzan Alexander, Donald M. Sell, Carolyn A. Bates

[57] ABSTRACT

Chemical complexes useful as bone-specific radiopharmaceuticals comprising technetium-99m and a complexing agent selected from the group consisting of: (1) stannous fluoride, $SnF_2$; (2) metal trifluorostannate, $MSnF_3$; and (3) metal pentafluorodistannate, $MSn_2F_5$; where M is either Na, K, $NH_4$, Li, Rb or Cs. The complexes are normally used in a biologically sterile, substantially isotonic aqueous medium, for diagnostic purposes.

4 Claims, No Drawings

TECHNETIUM-LABELED BONE SCANNING AGENTS

This is a continuation of Ser. No. 417,612 filed Nov. 20, 1973, and now abandoned.

FIELD OF THE INVENTION

This invention relates to chemical complexes of technetium. An aspect of this invention relates to complexes of the radioactive, metastable isotope technetium-99m (Tc-99m). A further aspect of this invention relates to complexes of technetium 99m wherein the complexing agent is selected from the group consisting of: (1) stannous fluoride, $SnF_2$; (2) metal trifluorostannate, $MSnF_2$; and (3) metal pentafluorodistannate, $MSn_2F_5$; where M is either Na, K, $NH_4$, Li, Rb or Cs. A further aspect of this invention relates to a process for producing the chemical complexes and a preferred physiological medium containing the complexes. Still another aspect of the invention relates to the use of the products of the invention as bone imaging agents.

DESCRIPTION OF THE PRIOR ART

The art of radiochemistry has found many applications in the fields of medicine and biology. It has long been known that the introduction into an organism of compounds containing (or "labeled" with) a radioisotope can provide insight into the anatomy and physiology of the organism. These compounds, generally referred to as radiopharmaceuticals, are particularly useful in diagnostic techniques which involve studying the structure or function of various interanl organs, e.g., the brain, with radiation detection means. For diagnostic work, isotopes with a short half life and an emission spectrum rich in gamma rays (as opposed to beta particles) are preferred.

The metastable isotope Tc-99m has a six hour half-life and an emission spectrum, 99% gamma radiation at 140 KeV, which is extremely well suited for techniques of diagnostic nuclear medicine. Thus, Tc-99m has a high specific activity, $5.28 \times 10^9$ millicuries per gram (mCi/g), and a conveniently rapid rate of decay; whereas its daughter product, Tc-99, has a specific activity which is almost nine orders of magnitude lower and a half-life which is roughly eight orders of magnitude longer. For the organism being studied or diagnosed, the slow rate of decay from any residual Tc-99 to its degradation product (ruthenium) would not normally produce any hazardous amounts of radiation, regardless of the biological means or route of elimination of the original Tc-99m radiopharmaceutical. For the researcher or the clinician, the emission spectrum of Tc-99m can provide high levels of accuracy in radiodiagnostic measurements and calculations. In recent years, Tc-99m has become readily available in hospitals through the use of selective elution from a so-called molybdenum-99 (Mo-99) generator. The isotope Mo-99 produces Tc-99m as a radioactive decay product.

Although Tc-99m compounds would appear to be ideal radiopharmaceuticals for diagnostic use, designing Tc compounds with a view toward organ specificity and tolerable levels of toxicity is not a simple matter. Obviously technetium compounds with a very high toxicity are undesirable for human or veterinary use, even in the small amounts called for by diagnostic work. Technetium compounds with insufficient in vivo stability may be poor diagnostic tools since radioactive ions or other chemical species with undesirable organ specificity may be liberated. Technetium compounds which have in vivo stability but become distributed generally throughout the organism or which do not reach a desired destination in the organism are also poorly suited for many studies of organ function or structure, e.g., bone studies.

In addition to the necessity of low toxicity and a high degree of concentration in the skeleton, Tc-99m complexes useful as bone imaging agents must exhibit: (1) a low degree of concentration in the liver, stomach, gut, and other soft tissue areas so as not to obliterate any parts of the bony framework, (e.g. the spine); (2) rapid disappearance from the blood and rapid uptake by the bone so that images may be obtained within a reasonable time after injection; and (3) stability in solution.

Subramanian et al. [Radiology 99:192–196, April 1971, and Radiology 102:701–704, March 1972] have prepared a number of Tc-99m polyphosphate complexes which have been shown to have bone-specific properties. These complexes are anionic in nature and are prepared by first reducing Tc-99m pertechnetate solution (obtained by elution from the Mo-99 generator in an oxidation state of +7) with stannous chloride and then adding a polyphosphate compound to form the complexes.

Subramanian also reports the preparation of technetium 99m complexes of orthophosphate, dihydrogen phosphate and fluorophosphate, but the skeletal localization of these complexes was unsatisfactory.

Technetium complexes with the ligands Ethane 1-hydroxy-l, 1 diphosphonate (EHDP), disclosed by McRae et al. in U.S. Patent 3,735,001 and with the ligand Pyrophosphate, described by Hopkins et al. (Journal of Nuclear Medicine, 14:6, p. 409, 1973) have been shown to be useful bone imaging agents.

These bone specific technetium complexes are formed in a similar manner as the technetium polyphosphate complexes described by Subramanian. Stannous chloride is used as a reducing agent to lower the oxidation state of pertechnetate, so that it will form a stable complex with the ligand. This reduction can occur before the ligand is added, or the stannous chloride may be present with the ligand before the pertechnetate solution is added. The resulting complexes are the same in either case.

Each of these known bone-specific technetium complexes contains three essential components: (1) Tc-99m; (2) stannous chloride; and (3) a complexing ligand. The stannous chloride is normally present only in an amount sufficient to bring about reduction of the pertechnetate ion, while it is the ligand component which is thought to impart bone-seeking properties to the complex.

Fluoride ions are known to be a trace element of bone crystal and it has been postulated that fluoride ions may influence calcium absorption at the bone crystal/tissue/fluid interface. For this reason, fluoride has been used therapeutically for the treatment of certain bone demineralization disorders, with varying success. Anbar and Ernst (Int. Journal of Applied Radiation 13: 45–51, 1962) have done distribution studies with certain cationic fluorocomplexes and noted that some of these complexes have good bone-localizing properties. These complexes were produced by reacting sodium fluoride with certain heavy metal inorganic salts. Neither tin nor technetium was present in these complexes.

Other researchers (e.g. Schwochau and Herr, Agnew Chem. 2:97, February 1963) have reported the preparation and properties of certain fluorotechnetium compounds, but these compounds do not contain tin, nor are they reported to have bone-seeking properties.

In so far as is known, prior to the present invention no bone-specific tin fluoride-technetium complexes had been prepared. The complexes of this invention have been found to be approximately equal to the prior art technetium complexes with polyphosphate, EHDP and pyrophosphate, in their ability to localize in the skeleton. As pointed out, these known bone-specific agents necessarily contain three components: (1) technetium-99m; (2) stannous chloride; and (3) complexing ligand. The bond-specific complexes of the present invention, however, contain only two essential components, Tc-99m and stannous fluoride; no other complexing ligand being necessary. The tin fluoride serves a dual purpose acting as reducing agent and complexing ligand.

In addition to a reduction in the number of necessary components, the technetium complexes of this invention are cationic in nature, whereas the three-component technetium complexes exhibit anionic properties.

BRIEF SUMMARY OF THE INVENTION

Briefly, this invention involves reducing an appropriate amount of radioactive pertechnetate ion (99m $TcO_4^-$) with tin fluoride or a metal fluorostannate until a major amount of the pertechnetate ion has been reduced to a technetium species having an oxidation state greater than 0 and less than +7, and simultaneously, forming a stable complex between the Tc-99m and the tin fluoride or metal fluorostannate. The reaction is carried out in the presence of dilute hydrochloric acid or other suitable acid at a pH range of 1-4.

The complex is suitable for injection into the blood stream of an animal when dissolved or dispersed in a biologically sterile aqueous medium substantially isotonic with mammalian body fluids. Within one hour after injection, the complex localizes in the skeleton to such an extent that bone visualization is possible with gamma radiation detection devices. When employed in the areas of human or veterinary medicine, the complexes of this invention are useful in the diagnosis of various bone disorders.

DETAILED DESCRIPTION OF THE INVENTION

The complexing agents of this invention are selected from the group consisting of: (1) tin fluoride, $SnF_2$; (2) metal trifluorostannates, $MSnF_3$; and (3) metal pentafluorodistannates, $MSn_2F_5$; where M is either Na, K, $NH_4$, Li, Rb or Cs.

All of the complexing agents of the above group dissociate readily in aqueous solution to form the ions $SnF^+$ and $SnF_3^-$. The ion $SnF^+$ is very unstable to air oxidation. It readily oxidizes to SnIV and thereby loses its ability to reduce pertechnetate ($TcO_4^-$) to a lower oxidation state. In order to increase the stability of the technetium-tin fluoride complexes in solution the amount of $SnF^+$ in solution must be minimized. This can be done by adding a metal halide, acid halide or both to produce a preponderance of the more stable tin halide ion $SnF_3^-$ or mixed halide ion $SnF_2Cl^-$. For purposes of the present invention, it is most convenient to add chloride as NaCl and HCl to aqueous tin fluoride thus producing the latter mixed halide ion. This ion forms a stable complex with technetium-99m.

The aqueous tin fluoride solutions must be maintained in a pH range of 1 to 4 to prevent formation of hydrated tin oxides and oxyfluorides (SnO and SnFOH). These insoluble hydrated compounds, which form by slow reaction with water, also complex with technetium-99m and will localize by mechanical entrapment in lung, liver and spleenic tissue thus interfering with normal studies of bone tissue.

The metal fluorostannates are the preferred complexing agents of this invention. These compounds are described by Donaldson and O'Donaghue [J. Chem. Soc. (1964), pp. 271, 275]. The metal fluorostannates are preferred over stannous fluoride because they are more stable in powder form. They are not hygroscopic, they are resistent to hydrolysis and atmospheric oxidation, and they do not attack glass. Because of these desirable chemical characteristics, these complexing agents can be used in radiopharmaceutical kits wherein complexing material is stored in glass vials for varying lengths of time before radioactive material is added. The preferred metal fluorostannates are sodium trifluorostannate, sodium pentafluorodistannate, potassium trifluorostannate and potassium pentafluorodistannate.

The Tc-99m used in this invention is obtainable from a Mo-99 generator in the conventional manner. Eluting or "milking" the generator with an aqueous meduim will provide the Tc-99-pertechnetate solution in the form of $M^x$ (99m-$TcO_4^-$)$x$, where $M^x$ is a pharmaceutically acceptable cation such as a proton, an alkali metal ion, an ammonium ion or the like and $x$ is a positive integer less than four. Typically, the aqueous elution medium is a saline solution which provides sodium 99m pertechnetate.

In preparing the complexes of this invention an appropriate amount of the dry complexing agent is placed in a clean glass vial. A small amount of dilute HCl or other suitable acid is added to form a solution with a pH range of 1 to 4, and finally an appropriate amount of pertechnetate solution (normally a saline solution of pertechnetate) is added. The reduction of the pertechnetate and simultaneous complexing of the ingredients takes place at room temperature usually within 5 minutes but no longer than 15 minutes.

The specific amount of complexing agent used as starting material depends on the toxicity of the complexing agent in the particular species to be studied. The amount of complexing agent injected into a test animal or human patient should preferably be less than 25 percent (e.g., less than 10 percent) of the LD 50 dose in mg. per kg. of body weight, though higher amounts are permissible in veterinary medicine. The LD 50 of $SnF_2$ in mice was found to be 15-30 mg./kg.

The amount of pertechnetate solution added to the complexing agent depends on the amount of radioactivity desired in the injected solution. This amount varies with: (1) the species to be studied; (2) the resolution power of the imaging device used; and (3) the needs of the individual researcher or clinician.

The amount of radioactive pertechnetate ion per milliliter of solution eluted from the Mo-99 generator decreases with the age of the generator; consequently, with time it becomes necessary to elute larger volumes in order to obtain the same amount of radioactivity. The radioactivity of the elution can be easily assayed with a conventional gamma detector, (e.g. Radx® or Mediac® Dose Calibrators).

The amount of Tc-99m-pertechnetate needed to produce an amount of radiopharmaceutical suitable for most diagnostic or research uses is generally in the range of about 0.01 millicurie per milliliter (mCi/ml.) of 99m-pertechnetate solution up to about 500 mCi/ml. of each solution. A total amount of 2 millicuries of radioactive material typically suffices for test purposes in the average (70 kg.) human. Only about $0.02 \times 10^{-10}$ gram of 99m-pertechnetate dissolved in a milliliter of aqueous medium (e.g. isotonic saline) is needed to provide 0.1 mCi/ml., and less than $100 \times 10^{-10}$ gram ($10^{-10}$ gram-atoms) of 99m-pertechnetate per milliliter of solution provides enough radioactivity for most uses.

Preferably, a large excess of complexing agent over pertechnetate is used to produce the complexes of this invention, (e.g. 64 micromoles of complexing agent per .00004 micromole of 99m pertechnetate). An excess of complexing agent is desirable to insure that the pertechnetate is maintained at a reduced oxidation state.

Owing to the short half life of Tc-99m, it is preferred to prepare small batches of pertechnetate solution for immediate use. Batches as small as 0.1 ml. can be adequate for animal studies (e.g. for injection into mice) and batches as large as 50 ml. are convenient for one or more injections into one or a group of human patients. If the solution is allowed to stand for a considerable period of time after preparation (greater than 8 hours), hydrolysis of a portion of the complex material may occur producing an insoluable technetium-99m species. It may then become necessary to filter the solution through a .22 micromillimeter millipore filter before injection to remove any precipitate.

The injected solution should be substantially isotonic with mammalian body fluids. In other words, the osmotic pressure exerted by the solution should be sufficiently similar, as compared to a body fluid such as blood, so that no dangerous hypo- or hypertonic condition results in the patient or test animal when 0.1 ml. (in the case of a mouse) or up to 10 ml. (in the case of a human) of the solution is injected into the animal's or patient's blood stream. If, after the solution is pepared it is hypotonic to blood, NaCl solution may be added to produce the desired isotonicity.

The pH of the injected solution ranges from 1 to 4. It is necessary to maintain a low pH in order to prevent precipitation of the complex before injection. After injection the pH is quickly neutralized to physiological pH by blood buffers (0.5 ml. of blood will neutralize 1.0 ml. of technetium-tin fluoride complex in a solution of pH 2.0), and no undesirable effects are produced in the organism. Once the solution is injected into the blood stream, its stability no longer appears to be pH dependent.

A convenient means of preparing the technetium complexes of this invention is to pre-formulate a radiopharmaceutical kit for use with a Mo-99 generator. For example 10 mg. of the complexing agent and a suitable amount (e.g. 1 ml.) of 0.1 M HCl can be hermetically and aseptically sealed in the same or separate vials. The vials can be conveniently stored until needed. For use, the acid is added to the vial containing the complexing agent followed by the addition of the desired amount of pertechnetate solution. The resulting radiopharmaceutical can then be injected into the blood of the patient or test animal. Final solution pH can be controlled by the quantity of acid and amount of pertechnetate used to prepare the complex.

Conveniently, the container is provided with a plunger and means for attaching a hypodermic needle so that the vial functions as a hypodermic syringe, whereby the solution of Tc-99m complex can be injected without being transferred to another container or syringe.

Skeletal images can usully be obtained within 1 hour after injection and therefter until about 24 hours after injection. The number of scans and the length of time between scans may vary with the nature of the diagnostic procedure.

The exact nature of the technetium complexes of this invention is not known. The complexes exhibit cationic properties, and the complexes are readily distinguishable from their precursors by thin layer chromatographic techniques.

The following examples illustrate the preparation and use of the complexes of this invention.

EXAMPLE 1

Tc-99m—Stannous Fluoride Complex

One milliliter of oxygen free 0.1 M HCl was added to 5.0 milligrams of $SnF_2$ (obtained from Alfa Inorganics) in a 5 milliliter amber glass vial. The vial was purged with nitrogen.

After the $SnF_2$ was dissolved, 25 microcuries of Tc-99m pertechnetate (99m $TcO_4^-$) obtained from a Mo-99 generator was added to the vial in 4.5 milliliters of isotonic sodium chloride solution.

The resulting Tc-99m-tin fluoride solution (pH 2.2) was set aside for 15 minutes. White Swiss Webster mice, each weighing about 20 grams, were injected (via the tail vein) with 0.1 milliliter of the solution containing the Tc-99m-Stannous fluoride complex.

At periodic time intervals the mice were sacrificed, dissected and assayed for Tc-99m activity using a gamma spectrometer.

The following table contains distribution results for the complex.

TABLE I

Biological Distribution of Tc-99m Stannous Fluoride Complex in Mice
(Percent total activity injected)

| Organ | ½ hour | 1 hour | 2 hours | 4 hours |
|---|---|---|---|---|
| Liver | 8.3% | 8.8% | 3.3% | 1.3% |
| Kidneys | 4.3% | 5.4% | 5.3% | 2.4% |
| Stomach | 1.5% | 0.7% | 0.4% | 0.3% |
| Intestines | 4.5% | 4.7% | 2.6% | 2.2% |
| Other organs | 2.0% | 2.3% | 0.8% | 0.5% |
| Urine and feces | 32.1% | 36.8% | 51.6% | 60.8% |
| Carcass | 47.3% | 41.3% | 36.0% | 32.5% |
| Bone/tissue ratio (carcass) | — | — | 3.5 | 5.4 |

The results show significant carcass, and hence skeletal, localization of the complex in mice. This is confirmed by the high bone (femur) to surrounding tissue ratio of Tc-99m activity.

The Tc-99m stannous fluoride complex prepared in this example was distinguished from pertechnetate (99m $TcO_4^-$) by thin layer chromatography. About 1.0 microliter of complex was spotted on a 2.5 cm $\times$ 10 cm. Eastman Chromagram® silica gel strip (#6060). After the spot had dried, the strip was developed with either dry acetone or dry acetone containing concentrated HCl in a volume to volume ratio of 100:0.5. The complex remained at the origin on the strip when acetone was used as the developing solvent, whereas the acetone:HCl developing solvent moved the complex up the strip with an Rf value of 0.63.

Either solvent moves pertechnetate with an Rf value of 1.0.

New Zealand white rabbits (5 kg. weight) were injected (via a marginal ear vein) with 1 cc. of a similarly made 99m Tc-stannous fluoride complex containing larger diagnostic quantities of 99m Tc pertechnetate (0.8 millicurie of 99m Tc in 1cc. of complex solution). The rabbits were scanned using a Picker rectiliner scanner, Magnascanner®. One hour after injecting the complex, Tc-99m activity had accumulated in the rabbit's long bones, pelvis, scapulas and spine. These skeletal areas were well differentiated from surrounding tissue.

EXAMPLE 2

Tc-99m—Stannous Fluoride Complex made using $KSnF_3$

White crystals of $KSnF_3$ ($SnF_2 \cdot KF$) were prepared from $SnCl_2 \cdot 2H_2O$ and $KF \cdot 2H_2O$ according to the method of U.S. Pat. No. 2,606,812.

One milliliter of oxygen-free 0.1 Molar HCl was added to 1.0 milligram $KSnF_3$ crystals in a 10 milliliter vial. The vial was purged with nitrogen. When the solid had dissolved, 70 microcuries of pertechnetate (99m $TcO_4^-$) was added to the vial in (9 milliliters of saline solution. The solution was set aside for 15 minutes to allow complete formation of the Tc-99m·$KSnF_3$ complex; pH of the complex was 2.5.

Distribution of the complex in mice was obtained as in Example 1. Results were similar to those presented in Examle 1 except for slightly lower carcass localization of Tc-99m activity.

A thin layer chromatographic analysis of the complex using the methods and materials from Example 1 showed similar Rf values for both acetone and acetone:HCl (i.e., Rf=0, and Rf=0.69, respectively).

EXAMPLE 3

Tc-99m Stannous Fluoride Complex made using $KSn_2F_5$ or $NaSn_2F_5$ $KSn_2F_5$ and $NaSn_2F_5$ were prepared according to the method described by Donaldson & O'Donoghue [J. Chem. Soc. (1964) p. 272]. $NaSn_2F_5$ appeared as a white "fluffy" powder having needle like crystals. $KSn_2F_5$ was white and "fluffy" and had six-sided platelet crystals.

One milliliter of Oxygen-free 0.1 Molar HCl was added to a vial containing 5.0 mg of $NaSn_2F_5$. The vial was purged with nitrogen.

Seventy microcuries of Tc-99m pertechnetate in 9 ml. of saline was added to the vial producing a Tc-99m stannous fluoride complex (pH 2:2) which gave bone-specific distribution results in white Swiss Webster mice similar to those of the complexes in Examples 1 and 2. Thin layer chromatography tests showed that the $NaSn_2F_5 \cdot$Tc-99m complex had an Rf value of 0.75.

EXAMPLE 4

Comparative Distributions of Various Bone Imaging Agents (1) Tc-99m·$Snf_2$ was prepared as in Example 1.

(2) Tc-99m-Polyphosphate was prepared by adding 50 microcuries of Tc-99m-pertechnetate in 5 milliliters of saline to a commercially available kit containing freeze-dried tin-polyphosphate (1 mg. of $SnCl_2$ and 40 mg. of polyphosphate).

(3) Tc-99m-Pyrophosphate was prepared by adding 50 microcuries of Tc-99m-pertechnetate in 5 milliliters of saline to a commercial kit containing 15.4 milligrams of stannous pyrophosphate.

(4) Tc-99m-Diphosphonate (EHDP) was prepared by adding 50 microcuries of Tc-99m-pertechnetate in 5 milliliters of saline to a commercial kit containing freeze-dried stannous-diphosphonate (5 milligrams Ethane 1 hydroxy-1, 1 diphosphonate and 0.5 milligram $SnCl_2$).

One-tenth milliliter of each of the respective Tc-99m bone-specific agents was injected into the tail veins of white Swiss Webster mice. The mice were sacrificed after apropriate time periods and assayed for activity using a Packard 2001® gamma spectrometer with a model 446 Armac® scintillation detector.

Bone/tissue ratios were obtained using hind legs of the mice.

The results were obtained 3 hours after injection of each of the Tc-99m bone-specific complexes, and are shown in the following table; and For comparison, the distribution of Tc-99m-pertechnetate obtained two hours after injecting the material into mice, is also shown.

TABLE II

Biolological Distribution of Some Bone Imaging Agents
(3 hours after injection of the radionuclide)

| Organ | 99mTc-$SnF_2$ | 99mTc-Polyphosphate[1] | 99mTc-Pyrophosphate[2] | 99mTc-EHDP[3] | 99m$TcO_4^-$ (2 hour) |
|---|---|---|---|---|---|
| Lungs | 0.3% | 0.2% | 0.1% | 2.1% | 1.2% |
| Liver and spleen | 1.8% | 1.1% | 3.5% | 0.9% | 7.0% |
| Kidneys | 1.6% | 0.7% | 0.7% | 0.9% | 7.0% |
| Stomach | 0.2% | 0.2% | 0.4% | 0.4% | 19.5% |
| Intestine | 2.5% | 1.1% | 2.6% | 5.0% | 16.1% |
| Urine and feces | 60.1% | 68.8% | 49.0% | 73.3% | 24.4% |
| Carcass | 33.5% | 27.8% | 43.6% | 17.4% | 27.4% |
| Bone/tissue ratio | 8.3 | 6.3 | 9.5 | 3.8 | 0.5 |

[1] New England Nuclear.
[2] Mallinckrodt.
[3] Diagnostic Isotopes.

What is claimed is:

1. A composition for use as a bone-specific radiodiagnostic agent which comprises: (1) $SnF_2$, (2) $MSnF_3$ or (3) $MSn_2F_5$, where M is either Na or K, containing from about .01 to 500 mCi of Tc-99m for each milligram of metal salt, characterized by a stable binding of the Tc-99m to the salt and distinguishable from its precursors by the following Rf values determined by thin layer chromatography on a 100 micron-thick, unactivated, neutral pH silica gel chromatogram sheet, wherein the silica gel of said chromatogram sheet is bound together with polyvinyl alcohol:

Rf=0, when said chromatogram is developed with anhydrous acetone;

Rf=0.6–0.8, when developed with anhydrous acetone containing concentrated HCl in a volume to volume ratio of 100:0.5.

2. A solution wherein the composition according to claim 1 is dissolved in a pharmaceutically acceptable parenteral diluent.

3. A solution according to claim 2 wherein the parenteral diluent is sterile, aqueous, isotonic saline solution.

4. A stable composition for preparing a biologically sterile liquid aqueous medium containing a bone-specific agent labeled with technetium-99m comprising a complexing agent selected from the group consisting of $SnF_2$, $MSnF_3$ and $MSn_2F_5$ where M is Na, K, $NH_4$, Li, Rb or Cs and enough HCl to produce a solution having a pH of 1 to 4.

* * * * *